United States Patent [19]

Persen

[11] Patent Number: 5,057,381
[45] Date of Patent: Oct. 15, 1991

[54] SATELLITE RECHARGEABLE BATTERY AND RECHARGER SYSTEM

[76] Inventor: David Persen, P.O. Box 1526, San Mateo, Calif. 94401

[21] Appl. No.: 630,816

[22] Filed: Dec. 20, 1990

[51] Int. Cl.⁵ .................................. H01M 10/46
[52] U.S. Cl. ............................... 429/7; 429/178; 320/2
[58] Field of Search ............... 429/7, 9, 100, 178; 320/2; 362/183

[56] References Cited

U.S. PATENT DOCUMENTS

| | | | |
|---|---|---|---|
| 3,360,708 | 12/1967 | Palmer-Persen | 429/52 X |
| 4,086,523 | 4/1978 | Izumi | 320/2 |
| 4,622,507 | 11/1986 | Persen | 429/9 X |

Primary Examiner—Anthony Skapars
Attorney, Agent, or Firm—M. Reid Russell

[57] ABSTRACT

A satellite rechargeable battery configured in a standard C or D size or larger size dry-cell battery housing and includes a standard secondary or charging cell that is preferably a nickel-cadmium cell. The satellite battery includes a head insert that is pivotally mounted to the ends of rods that telescope longitudinally from the battery housing, with the head insert to rotate through ninety degrees (90°) between a first coupled attitude into the battery housing, at its upper or positive pole end, configuring the battery as a standard dry-cell battery, and a second coupled attitude presents a curved undersurface as a seat that extends from the battery housing side to receive a charging battery fitted thereagainst. A conductive bar extends from the head insert curved undersurface for fitting into an electrically receptacle connected into a charging circuit of a charging battery, head insert second position in which the satellite battery positive and negative poles are disconnected from its secondary cell. Which satellite battery also includes a charging receptacle for connecting a conductive bar of a second satellite battery therein for serially passing a current thereto from the charging battery and first satellite battery for charging that second satellite battery also.

9 Claims, 2 Drawing Sheets

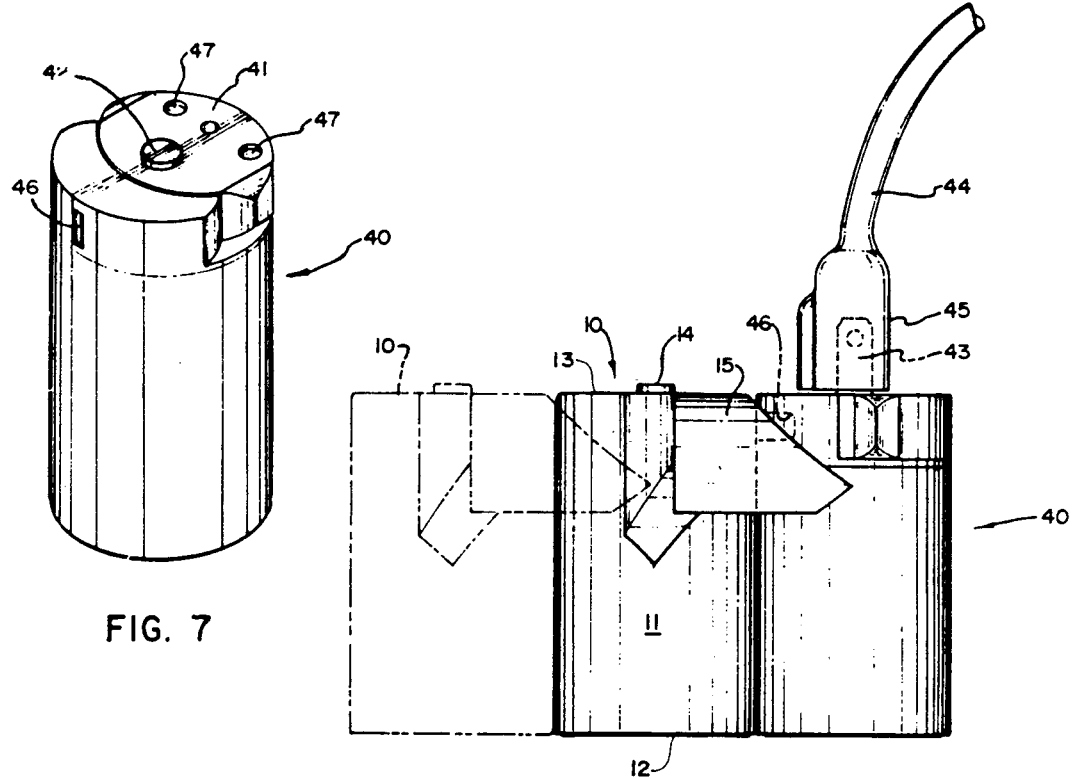
FIG. 7
FIG. 9
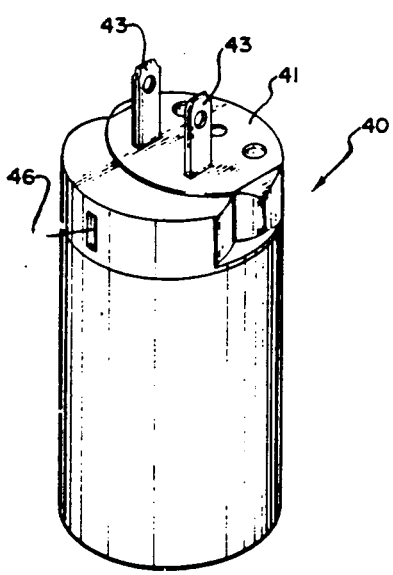
FIG. 8
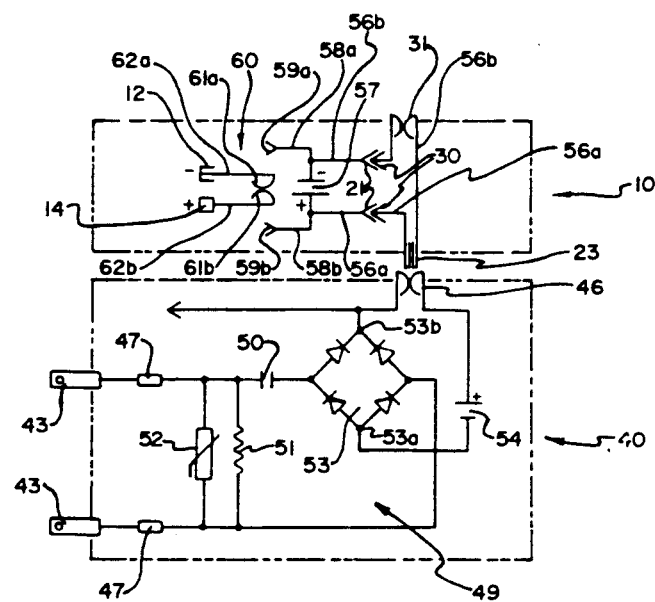
FIG. 10

5,057,381

SATELLITE RECHARGEABLE BATTERY AND RECHARGER SYSTEM

BACKGROUND OF THE INVENTION

1. Field of the Invention

This invention relates to rechargeable batteries as for example, nickel-cadmium cell batteries and charging arrangements therefore.

2. Prior Art

A number of rechargeable batteries with integrated rechargers have heretofore been developed. For example, the present inventor has been issued U.S. Pat. Nos. 3,360,708 and 4,622,507 for such. Additionally, U.S. Pat. No. 3,533,119 has been issued to S. J. Dokos for a "Cordless Portable Electric Appliance", and a rechargeable battery is shown in U.S. Pat. No. 4,086,523 issued to Izumi.

The present invention, in addition to a modified rechargeable integrated battery and recharger of the U.S. Pat. No. 4,622,507 as a prime charging battery includes at least one satellite rechargeable nickel-cadmium cell battery that can be configured for charging from the prime battery, and provides a circuit arrangement for disconnecting the satellite battery poles during charging.

The combination of the integrated battery and recharger of the U.S. Pat. No. 4,622,507 as a recharging source and a satellite rechargeable battery or batteries and their circuitry for safe recharging is distinct from the rechargeable batteries cited above.

SUMMARY OF THE INVENTION

A principal object of the present invention is to provide a satellite rechargeable battery that can be configured to receive a charging current from a source of a recharging current consisting of a pivoting head section that can be alternatively positioned to where the satellite battery is configured as a dry-cell battery and is rotated to receive and couple to a recharging source, to arrange the satellite battery in a charging mode.

Another object of the present invention is to provide as the charging source a prime recharging battery that is a modified integrated battery and recharger for electrical connection into a standard house current receptacle and a connection arrangement for simultaneously charging the satellite rechargeable battery secondary or storage cell along with the secondary or storage cell of which prime battery.

Another object of the present invention is to provide circuitry for safely coupling the prime and satellite rechargeable batteries as they are coupled together in a charging mode whereby all the battery poles are disconnected from the charging circuits during that charging process.

Still another object is to provide prime and satellite rechargeable batteries that are of standard battery sizes, such as C or D size batteries, with the storage cells integral therewith.

Another object of the present invention is to provide one or more satellite rechargeable batteries configured for coupling together, each in a charging mode, whereby each of the satellite rechargeable batteries secondary or storage cells are electrically disconnected from the battery poles during charging.

In accordance with the above objects, the present invention is in a combination of a prime integral battery and recharger with at least one satellite rechargeable battery and an arrangement for electrically coupling the batteries together for providing simultaneous charging. The individual battery components are preferably contained within a standard C or D cell cylindrical housing or casing, or within another standard battery housing. Each individual battery includes a rechargeable storage secondary or charging cell, such as a nickel-cadmium cell. The prime integrated battery and recharger contains a charging circuit for converting a standard household current into a charging current, which current is passed to its storage cell. The prime battery also provides an electrical coupling or receptacle arrangement for also coupling to and routing a transformed charging current to the secondary cells of a satellite battery. Each satellite battery contains a nickel-cadmium storage cell as the secondary or storage cell, and provides for electrically coupling it to both another satellite rechargeable battery and to the prime charging battery.

The prime charging battery and the satellite rechargeable battery or batteries each include disabling components for breaking a current flow path to the individual battery poles during charging.

The satellite rechargeable battery includes a pivoting head insert that is for alternatively configuring the satellite rechargeable battery as a conventional or standard dry-cell battery or in a recharging mode. The head insert is pivotally mounted to ends of rails that are arranged to telescope longitudinally, in side-by-side relationship, out from the battery housing. The head insert includes a first pair of recesses that are for receiving conductive pins that extend from a stepped portion base of the battery housing at its top end, the head insert is fitted to the housing in a stored attitude where the satellite battery nickel-cadmium storage cell is connected to the battery poles as a standard dry-cell battery. To position the satellite battery into a charging mode the head insert, that is pivotally mounted to the rail ends, is pulled outwardly off of its seat, and is then rotated through ninety degrees (90°). A curved or arcuate portion of that head insert wherefrom a conductive bar extends is thereby exposed to couple into the side of another rechargeable satellite battery or to a prime battery, to pass a charging circuit between the batteries.

The prime rechargeable integrated battery and recharger is essentially like that shown in the U.S. Pat. No. 4,622,507, and additionally includes an electrical receptacle arrangement for linking it, in side-by-side relationship, to a satellite battery. That connection provides a serial electrical connection for simultaneously charging both the prime battery and a connected satellite rechargeable battery, of which satellite rechargeable battery can, in turn, be serially connected to another satellite rechargeable battery for also providing simultaneous charging thereof.

THE DRAWINGS

These and other objects of the present invention will become more clear from the accompanying drawings that are described in the following detailed description in which preferred embodiments are described in conjunction with the drawings.

FIG. 7 shows a side elevation view of a prime integrated battery and recharger configured to function as a standard dry-cell battery;

FIG. 8 shows the prime battery of FIG. 7, with the head thereof having been rotated through one hundred eighty degrees (180°) and refitted to the battery top, and showing electrically conductive blades extending outwardly from the battery top;

FIG. 9 shows a side elevation view of a satellite rechargeable battery coupled to the prime battery of FIG. 8 configured in a charging mode with the electrically conductive blades shown coupled into a female end of an electrical cord, and showing in broken lines, a second satellite rechargeable battery coupled in a charging configuration to the first satellite rechargeable battery; and FIG. 10 shows an electrical schematic of a charging circuit for a nickel-cadmium cell of the prime battery and shows a satellite rechargeable battery coupling circuit for connecting the charging circuit of the prime battery to the satellite rechargeable battery secondary or nickel-cadmium cell.

DETAILED DESCRIPTION OF THE INVENTION

FIGS. 1 through 6 show a preferred embodiment of a satellite rechargeable battery 10 of the present invention, hereinafter referred to as satellite battery 10. Shown therein the satellite battery 10 is configured as a standard D cell size battery commonly used for powering flashlights, toys, and the like, although, it should be understood, this arrangement could also be employed in other sizes of batteries to include C cells, standard 9 volt batteries, lamp batteries, or the like. For the purpose of this disclosure however, the satellite battery 10 will be described herein in relation to its arrangement as a standard D cell size battery.

Figure 1:
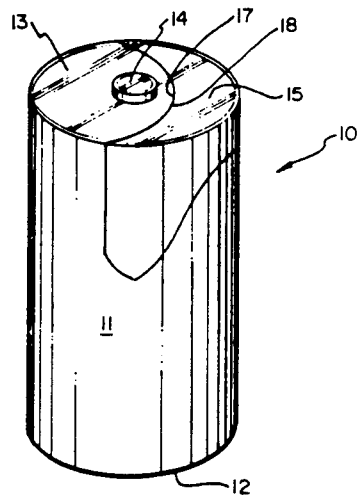
FIG. 1 shows a side elevation view of a satellite rechargeable battery of the present invention, configured as a conventional D cell size battery.
Figure 4:
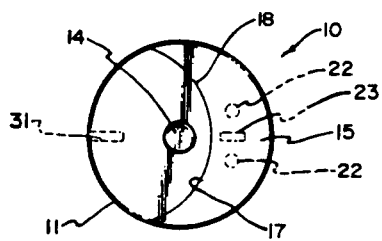
FIG. 4 shows a top plan view of the satellite rechargeable battery of FIG. 1.

In FIGS. 1 through 6, the satellite battery 10 is shown to include a cylindrical casing 11 that is preferably formed from a non-conductive material such as a plastic and includes a flat casing base 12 and a casing top 13. In the casing base 12 is the battery negative pole and the casing top 13 is preferably formed of a non-conductive material such as a plastic, and includes a positive pole 14, shown as a round button, that extends outwardly from the center thereof. Satellite battery 10 as shown in FIGS. 1 and 4, is configured as a conventional dry-cell battery. Satellite battery 10 as a rechargeable battery preferably includes a conventional nickel-cadmium cell, or the like, as its storage or secondary cell. When electrical energy is dissipated from the nickel-cadmium cell, that cell can be recharged by applying a charging current thereto. The nickel-cadmium cell is hereinafter referred to as the secondary cell.

The satellite battery 10 provides for recharging of its secondary cell by connection through a prime integrated battery and recharger 40, like shown in FIGS. 7 through 9, as will be described in detail hereinbelow.

Figure 5:
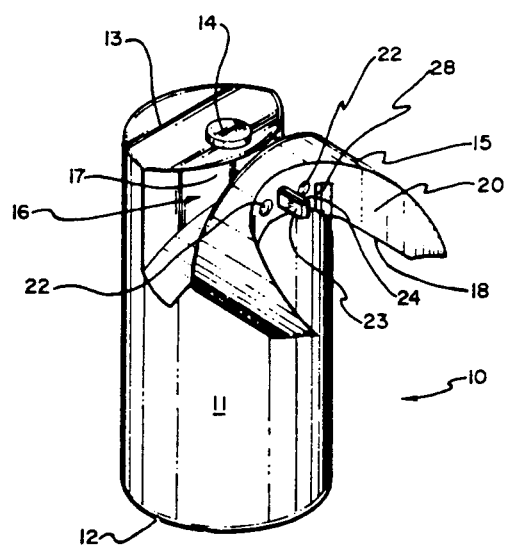
FIG. 5 shows a profile perspective view of the satellite battery of FIG. 1, with the head insert shown extending from the battery side for receiving and connecting to either another satellite rechargeable battery or to a prime battery for charging.
Figure 2:
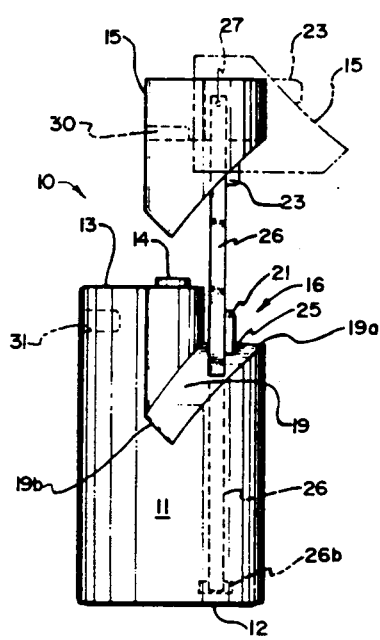
FIG. 2 shows a side elevation view of the satellite rechargeable battery of FIG. 1, with a head insert thereof shown pivotally mounted and elevated on the ends of telescoping rails that extend longitudinally out from the battery housing top, the head insert shown in broken lines rotated through ninety degrees (90°)

For electrically coupling the satellite battery 10 to the prime or recharging battery 40, as shown in FIGS. 2 through 6, the satellite battery includes a pivotally coupled head insert 15 that, when mounted to the battery casing 11, as shown in FIGS. 1 and 4, configures the battery as a conventional C or D size dry-cell battery. In the configuration of FIGS. 1 and 4, the satellite battery head insert 15 is nested in a stepped portion 16 of the satellite battery housing 11. Which stepped portion, as shown, has a curved vertical face 17 that receives an arcuate face 18 of the head insert 15. The housing curved longitudinal face 17 intersects, at a right angle, a downwardly curved horizontal base 19, as the step tread or base. The downwardly curved base 19, as shown best in FIGS. 1, 2 and 5, is oppositely curved from an apex 19a, curving downwardly and around the sides of the cylindrical housing 11 terminating in forwardly sloping edges 19b. The curve of the stepped portion base 19 conforms to the curve of the base or undersurface 20 of the head insert 15, the head insert undersurface having opposing arms that are spaced appropriately apart to receive and closely fit against the side of the cylindrical housing 11 of another satellite battery or a prime charging battery. This relationship is shown best in FIG. 3, where the head insert arcuate base 20 is shown to have an arc to fit snugly through nearly one hundred eighty degrees (180°) of arc around the cylindrical housing 11. With the head insert 15 positioned as shown in FIG. 5, another satellite battery 10 or the cylindrical housing of the prime charging battery 40, as shown in FIG. 9, will nest closely thereagainst, as discussed hereinbelow.

The arc of both the housing stepped portion base 19 and the head insert arcuate undersurface 20 are curved identically and which arc is such to accommodate the cylindrical surface of another satellite or a prime battery, 10 or 40, nesting between the head insert undersurface 20 arms. The arcuate shape of the notch wall 17, shown in FIGS. 1, 4 and 5, while not critical to the invention, is preferred for convenience in fitting the head insert securely thereto while maximizing the space available within the satellite battery housing 11, and for positioning of the battery positive pole 14 centered in the battery casing top 13.

Figure 3:
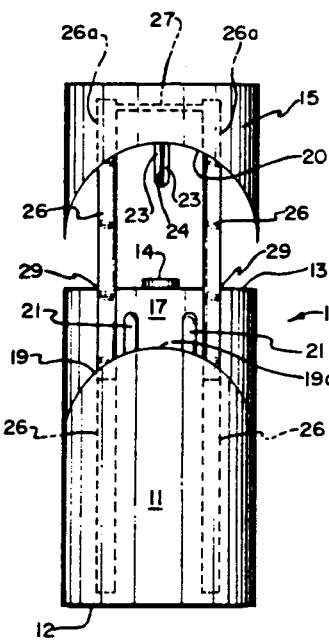
FIG. 3 shows a side elevation view of the satellite rechargeable battery of FIG. 2.

In FIGS. 2 and 3, the cylindrical housing stepped portion base 19 is shown to include a pair of upstanding posts 21 projecting therefrom. The upstanding posts 21 are for fitting into cavities or holes 22 that are formed in the head insert 15 arcuate undersurface 20. Another pair of pin holes 30 are formed in the head insert arcuate face 18, for electrically connecting the upstanding posts 21 to a conductive bar 23, as discussed hereinbelow with respect to FIG. 10. Shown best in FIG. 3, the conductive bar 23 includes a layer of insulation 24 sandwiched between and electrically separating conductors which conductive bar 23 extends at a right angle outwardly from the center of apex of the head insert arcuate undersurface 20.

In the arrangement of the satellite battery 10 shown in FIG. 1, the conductive bar 23 is fitted into an electrical receptacle 25 in the stepped out portion base 19, as shown in FIG. 2, the conductive bar 23 configuring the satellite battery as a conventional dry-cell battery the secondary or storage cell connected to the battery positive and negative poles, as will be discussed later herein with respect to FIG. 10. In the configuration of FIGS. 1 and 4, the pair of pins 21 that extend upwardly from the cylindrical housing stepped portion base 19 serve to guide the head insert conductive bar 23 into the electrical receptacle 25, configuring the satellite battery, as discussed hereinbelow with respect to FIG. 10, as a conventional dry-cell battery. Which pair of pins 21 when fitted into the head insert holes 30 both provide for maintaining that head insert securely to the cylindrical housing, and provide for electrically coupling the conductive bar 23 across the secondary cell as shown in FIG. 10. Which conductive bar 23 is to fit into a charging receptacle 31 of another satellite battery, as shown in broken lines in FIG. 2, or into a receptacle 46 of the prime battery 40, shown in FIGS. 7 through 9, passing a charging current, as discussed hereinbelow with respect to FIG. 10.

Figure 6:
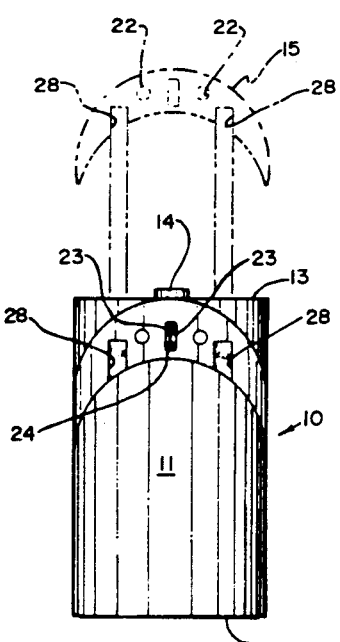
FIG. 6 shows a side elevation view of the satellite battery of FIG. 5, with, in broken lines, the head insert showing elevated on the telescoping rails of FIG. 2, in anticipation of its being pivoted through ninety degrees (90°) to the attitude shown in FIGS. 2 and 3, for fitted back into the battery top, to the attitude shown in FIG. 1.

As set out above, the head insert 15 is to be movable through ninety degrees (90°), as illustrated in the solid and broken line arrangement of FIG. 2, nesting in the stepped out portion 16 of the battery cylindrical housing 11. To provide for this head insert 15 rotation, the head insert is mounted, as shown in broken lines in FIGS. 2 and 3, across the ends 26a of telescoping rods 26. Which rods 26 receive the ends of a pin 27 maintained in the head insert, pivotally mounting that head insert to the rod ends 26a. The head insert 15 is thereby rotatable through at least ninety degrees (90°) between the attitudes shown on FIGS. 2 and 5. To allow for which pivotally movement, the head insert 15 is notched at 28 shown in FIGS. 5 and 6, across the edge of the abutting arcuate face 18 and undersurface 20 to allow for travel of the rod ends 26a thereacross, as shown in FIGS. 5 and 6. The rails 26 whereto the head insert 15 is mounted are arranged to telescope into and out of the cylindrical housing 11 interior extending out from the cylindrical housing base 19, as shown in FIGS. 2 and 3. End stops 26b are provided to the rail 26 interior ends, extending thereacross to preclude the rails from being pulled out openings 29 through the cylindrical housing 11 stepped out portion base 19, as shown in FIG. 3. The head insert 15 pivotal mount onto the ends 26a of rails 26, allows it to be pulled from its stowed attitude, shown in FIG. 1, to its attitude, as shown in FIG. 2, and pivoted through ninety degrees (90°) to the attitude shown in broken lines in FIG. 2. The head insert 15 can then be lowered back onto and reconnected to the cylindrical housing stepped portion base 19, as shown in FIG. 5. In which connection, head insert holes 30 as shown in broken lines in FIG. 2, each receive one of the pair of pins 21, that extend from the base 19, as shown in FIGS. 2 and 3. So arrange, the pins 21 fitted in holes 30 are electrically coupled to the conductive bar 23.

With the head insert 15 mounted to the base 19 of the stepped out portion 16 of the cylindrical housing 11, as shown in FIG. 5, the conductive bar 23 is ready to receive a charging current therethrough for charging the satellite battery secondary cell. The conductive bar 23 consists of two independent conductors each formed of a conductive material, preferably metal, and are separated by a layer of insulator 24 material that may be air. The conductive bar 23 is to fit into a charging circuit of a prime charging battery 40, as set out hereinbelow, or can be fitted into and charged from another satellite battery 10. For accommodating the conductive bar 23 fitted into another satellite battery, a receptacle opening 31, shown in broken lines in FIG. 2, is provided in the side of the satellite battery 10. Receptacle 31 is also shown in the schematic of FIG. 10 for serially linking the secondary or charging cells of the satellite batteries together for simultaneous charging from the prime battery, in which charging configuration the individual positive and negative poles of each satellite battery are not connected to the secondary cell, as discussed in detail hereinbelow with respect FIG. 10.

FIG. 8 shows a preferred prime battery and recharger 40 of the present invention, hereinafter referred to as prime battery 40. FIGS. 7 and 8 show the prime battery 40 configured, respectively, in FIG. 7 as a conventional dry-cell battery, and in FIG. 8 as a recharging battery. The prime battery 40, is preferably the integrated battery and recharger shown in U.S. Pat. No. 4,622,507 that has been modified to connect satellite batteries into its charging circuit, as discussed hereinbelow. Which prime battery includes a rotating head 41 that is removable or may be pivotally mounted on rails like the rails 26 of the satellite battery 10, so as to be rotatable to either the dry-cell configuration, with a positive pole or post 42 extending therefrom, or when rotated and connected presents a pair of electrical conductive blades 43 that extend outwardly therefrom, as shown in FIG. 8. The blades 43 are for connection into a conventional electrical outlet or a female electrical cord that is connected to a conventional 110 volt outlet. Shown in FIG. 9, an electrical cord 44, with plug end 45, receives the blades 43 fitted therein, it being understood that the opposite cord 44 end is plugged into a conventional electrical outlet, passing an electrical current therethrough and into the prime battery 40 and a satellite battery or batteries 10, coupled thereto as will be discussed hereinbelow with respect to discussion of FIG. 10. The preferred prime battery 40, as set out above, is that described in my aforementioned U.S. Patent, except that a receptacle 46 is included therewith for receiving the above described conductive bar 23 of a satellite battery 10 fitted therein. Which connection provides a charging current to the satellite battery during charging of the prime battery 40. Which satellite battery 10 can also be connected to other satellite batteries, providing charging thereof, as illustrated in broken lines in FIG. 9. The charging function is discussed hereinbelow with respect to FIG. 10. Where the aforesaid integrated battery and recharger of U.S. Pat. No. 4,622,507, modified with receptacle 46, and its serial electrical connection into the prime battery charging circuit is preferred, it should be understood that the another rechargeable battery that is configured to receive and electrically connect its charging circuit to the conductive bar 23, or other charging arrangement configured to connect to the satellite battery 10 secondary cell, could be employed within the scope of this disclosure.

FIG. 10 shows a schematic of a satellite battery 10, configured as shown in FIG. 5, with the conductive bar 23 extending therefrom into a prime battery 40. The prime battery 40, is shown configured to a charging mode to receive conventional 110 volt current through blades 43 with the satellite battery 10 shown electrically connected into charging circuit 49 of which prime battery through conductive bar 23. Which conductive bar is shown fitted into the prime battery receptacle 46. In practice, as set out above, additional satellite batteries 10 (shown in broken lines in FIG. 9), can be serially connected, fitting conductive bars 23 of each into a satellite battery receptacle 31.

In FIG. 10, the blades 43 are shown transmitting electrical energy through pins 47 that are contacts in the head 41 located in the holes or recesses 47 coupling into the recharging circuit 49. The preferred charging circuit 49, it should be understood is both structurally and functionally identical to that shown in said U.S. Pat. No. 4,622,507, and includes a capacitor 50 serially connected to a diode bridge 53 and to a high resistance resistor 51 that is in parallel with a varistor 52 as to the charging circuit. The charging circuit 49 shown connected at legs 53a and 53b across secondary cell 54 for providing a full wave to a direct current of an alternating current source. The secondary cell 54 is preferably a nickel-cadmium cell, with its positive side connected to the satellite battery 10 of receptacle 46, between leg 53b of the diode bridge. The receptacle 46 is shown receiving the conductive bar 23 fitted therein, serially connecting the charging circuit 49 to the satellite battery secondary cell 57 through the holes 30 in the head insert 15 and pins 21 that extend from the stepped out portion base. Shown in FIG. 10, with the conductive bar 23 so fitted into the receptacle 46, a charging current will pass through the wires 56a and 56b to the secondary cell 57 that is the nickel-cadmium storage cell of the satellite battery. The secondary cell 57, in turn, connects through leads 58a and 58b to poles 59a and 59b, respectively. An electrical seat 60 is shown fitted between but is normally not connected to which poles 59a and 59b. Which electrical seat consists of a pair of spring contacts 61a and 61b, respectively, that are flexed apart, when the conductive bar 23 is fitted therebetween.

When the satellite battery 10 is configured as shown in FIGS. 1 and 4, conductive bar 23 is positioned between the spring contacts 61a and 61b of the electrical seat 60, connecting the contacts 61a and 61b to poles 59a and 59b, electrically coupling the secondary cell 57 across the battery negative and positive poles 12 and 14, respectively, through the connecting lines 62a and 62b. So arranged, when the conductive bar 23 is installed in the receptacle 25 of FIG. 2, as illustrated in FIG. 1, that conductive bar 23 fits between and separates the spring contacts 61a and 61b. Whereas, when the satellite battery is configured in the charging mode, as shown in FIG. 10, the spring contacts 61a and 61b are not spread by the conductive bar and do not engage the posts 59a and 59b. Accordingly, the nickel-cadmium cell 57 is not connected across the battery negative and positive poles 12 and 14, prohibiting a person from receiving an electrical shock therethrough during the charging process.

A preferred arrangement of a satellite battery has been shown and described herein for inclusion with a integrated battery and recharger. It should, however, be understood that other charging arrangements and circuits to supply a charging current to the satellite battery or batteries secondary cells could be employed within the scope of this disclosure and therefore it should be understood that the present disclosure is made by way of example only and that changes and modifications can be made thereto without departing from the subject matter coming within the scope of the following claims and reasonable equivalency thereof, which claims I regard as my invention.

I claim:

1. A satellite rechargeable battery and recharger system comprising, a battery housing that contains a secondary cell and wiring for connecting it to external positive and negative poles; a head insert that is configured to fit to battery housing and to be movable between first and second positions, in which first position said head insert nests into said battery housing, with a conductive bar means thereof extending into said battery housing that provides for electrically connecting said secondary cell to said battery poles, and in which second position said conductive bar means of said head insert is positioned to extend from said head insert to fit into a receptacle of a means for passing a charging current thereto, said conductive bar means electrically connected to pass charging current into said secondary cell; and a means for providing a charging current to said receptacle.

2. A satellite rechargeable battery and recharger system as recited in claim 1, wherein the battery housing is cylindrical and includes a stepped portion formed in a top and side edge thereof, which stepped portion receives the head insert nesting therein when said head insert is in the first position.

3. A satellite rechargeable battery and recharger system as recited in claim 2, wherein the cylindrical housing stepped portion includes a right angle vertical face and a base at a normal angle thereto, which said base curves equally downwardly from its apex, the arc of which base curve conforms to the curve of the side of the cylindrical battery housing; and the undersurface of which head insert is curved identically to fit closely against said stepped portion base.

4. A satellite rechargeable battery and recharger system as recited in claim 2, wherein the conductive bar means extends from the undersurface of the head insert; and, with the head insert in the first position, said conductive bar means fits into a receptacle in said stepped portion base, fitting between a pair of spring contacts that individually connect, respectively, to the satellite rechargeable battery positive and negative poles, which spring contacts are spread apart by said conductive bar means to make electrical contact with poles of conductive leads from across the secondary cell.

5. A satellite rechargeable battery and recharger system as recited in claim 4, wherein the head insert is rotated through ninety degrees (90°) from its first to second positions, in which second position the head insert undersurface faces outwardly from the side of the battery housing, the conductive bar means extending from said head insert undersurface to fit into the receptacle of the means for providing a charging current; the conductive bar means consists of a sandwich of a pair of conductors separated by an insulator; a pair of pins extend side-by-side from stepped portion base of the cylindrical housing, for individually coupling into holes containing conductors in said head insert, for electrically linking said conductive bar means conductors to said pins; and circuitry for electrically connecting said pins across the secondary cell.

6. A satellite rechargeable battery and recharger system as recited in claim 5, further including an electrical receptacle including a pair of normally closed spring contacts in the circuit across the secondary cell, said spring contacts individually connecting to the conductors of a conductive bar means of another or second satellite rechargeable battery fitted therein, for serially connecting the secondary cells of the two satellite rechargeable batteries.

7. A satellite rechargeable battery and recharger system as recited in claim 2, wherein the head insert is pivotally mounted to a telescoping rail means that are incorporated in the battery housing for telescoping therefrom so as to allow said head insert to be rotated between its first and second positions.

8. A satellite rechargeable battery and recharger system as recited in claim 7, wherein the rail means is a pair of rails, each slidably fitted through an opening in the battery housing; and the head insert is pivotally mounted across ends of said rails, which said head insert is slotted thereacross at its pivotal couplings to accommodate travel of each said rail across said head insert as said head insert is pivoted through approximately ninety degrees (90°).

9. A satellite rechargeable battery and recharger system as recited in claim 1, wherein the means for providing a charging current to a satellite rechargeable battery is an integrated battery and recharger that is configured to receive a charging current from a conventional 110 volt source and to convert it to charge a secondary cell of which integrated battery and recharger; and an electrical receptacle of said integrated battery and recharger electrically connected into said charging circuit having a pair of normally closed spring contacts that complete an electrical flow path across a secondary cell of said integrated battery and recharger, which said spring contacts are arranged to receive the conductive bar means of a satellite rechargeable battery fitted therein, completing a serial electrical connection with satellite rechargeable battery secondary cell in the charging circuit, to the secondary cell of said integrated battery and recharger.

* * * * *

UNITED STATES PATENT AND TRADEMARK OFFICE
CERTIFICATE OF CORRECTION

PATENT NO. : 5,057,381

DATED : October 15, 1991

INVENTOR(S) : David Persen

It is certified that error appears in the above-indentified patent and that said Letters Patent is hereby corrected as shown below:

On the title page, Item [76] add --David K. Powers--

Signed and Sealed this

Third Day of August, 1993

Attest:

MICHAEL K. KIRK

*Attesting Officer*  *Acting Commissioner of Patents and Trademarks*